United States Patent
Kluka et al.

(10) Patent No.: US 10,081,275 B2
(45) Date of Patent: Sep. 25, 2018

(54) AUXILIARY SEATING SYSTEM FOR LIGHT WEIGHT UTILITY VEHICLE

(71) Applicant: Textron Inc., Providence, RI (US)

(72) Inventors: Robert Kluka, Evans, GA (US); Mike Hebert, Evans, GA (US)

(73) Assignee: Textron Innovations Inc., Providence, RI (US)

( * ) Notice: Subject to any disclaimer, the term of this patent is extended or adjusted under 35 U.S.C. 154(b) by 90 days.

(21) Appl. No.: 15/406,969

(22) Filed: Jan. 16, 2017

(65) Prior Publication Data

US 2018/0201164 A1 Jul. 19, 2018

(51) Int. Cl.
| | |
|---|---|
| *B60N 2/46* | (2006.01) |
| *B60N 2/30* | (2006.01) |
| *B60N 2/38* | (2006.01) |
| *B60R 7/04* | (2006.01) |
| *B60R 22/26* | (2006.01) |
| *B60N 3/02* | (2006.01) |
| *B60N 2/75* | (2018.01) |

(52) U.S. Cl.
CPC ......... *B60N 2/3097* (2013.01); *B60N 2/3038* (2013.01); *B60N 2/38* (2013.01); *B60N 2/46* (2013.01); *B60N 2/75* (2018.02); *B60N 3/02* (2013.01); *B60R 7/043* (2013.01); *B60R 22/26* (2013.01); *B60R 2022/266* (2013.01)

(58) Field of Classification Search
CPC ...... B60N 2/3097; B60N 2/3038; B60N 2/38; B60N 2/46
USPC .............................................. 296/69, 66, 64
See application file for complete search history.

(56) References Cited

U.S. PATENT DOCUMENTS

| | | | | |
|---|---|---|---|---|
| 5,482,346 A | * | 1/1996 | Lesourd | B60N 2/3013 296/66 |
| 5,639,141 A | * | 6/1997 | Hanemaayer | B60N 2/062 296/156 |
| 6,237,981 B1 | * | 5/2001 | Selleck | B60N 2/24 296/39.2 |
| 7,396,066 B2 | | 7/2008 | Houston | |
| 7,434,861 B2 | * | 10/2008 | Arias | B60N 2/005 296/63 |
| 7,980,628 B2 | | 7/2011 | Hu et al. | |
| 8,002,331 B2 | * | 8/2011 | Bowers | B60N 2/3013 296/183.2 |
| 8,167,351 B2 | * | 5/2012 | Plowman | B60N 2/305 296/69 |
| 8,752,879 B1 | * | 6/2014 | Heit | B60P 3/423 296/39.1 |
| 9,481,265 B2 | | 11/2016 | Moore et al. | |

(Continued)

*Primary Examiner* — Pinel E Romain
(74) *Attorney, Agent, or Firm* — Sandberg Phoenix & von Gontard P.C.

(57) ABSTRACT

An auxiliary seating system for a light weight utility vehicle that comprises a seat support cage attachable to a rear portion of the vehicle, and a pair of seat assemblies mounted to the cage structure such that each seat assembly is oriented to be facing at least partially inward toward a longitudinal center line of the vehicle. Each seat assembly comprises a seat bottom that is pivotal between a down position and an up position. Each seat assembly can include a golf bag yoke disposed on an underside of the seat bottom, and a seat belt that retains a passenger within the seat assembly when the seat bottom is in the down position, and retains a golf bag within the respective golf bag yoke when the seat bottom is in the up position.

20 Claims, 6 Drawing Sheets

(56) References Cited

U.S. PATENT DOCUMENTS

| | | | |
|---|---|---|---|
| 9,744,882 B2 * | 8/2017 | Korte | B60N 2/10 |
| 2011/0148144 A1 * | 6/2011 | Kosuge | B60P 3/423 |
| | | | 296/182.1 |

* cited by examiner

AUXILIARY SEATING SYSTEM FOR LIGHT WEIGHT UTILITY VEHICLE

FIELD

The present teachings relate to light weight utility vehicle seating structures, and more particularly to an auxiliary seating structure for light weight utility vehicles.

BACKGROUND

The statements in this section merely provide background information related to the present disclosure and may not constitute prior art.

Utility vehicles often have an auxiliary row of seating located behind the passenger cabin on the back portion of the vehicle. Typically, such known auxiliary seating comprises one or more seat or seating structure that faces rearward or backward with regard to the front of the vehicle. That is, passengers sitting in such rearward facing auxiliary seats are typically facing away from the driver (and possibly passenger) sitting in the front or forward most seat(s) or seating structure(s) of the vehicle, and in an opposite direct than the driver (and possibly passenger).

In various instances, such vehicles can comprise golf carts that include an auxiliary seating structure that allows the cart to be convertible between a golf cart configuration having golf bag storage behind the front seating structure and transportation configuration having a rear facing auxiliary seating structure behind the front seating structure. In various other instances, such vehicles can comprise a light weight utility vehicle configured to have a permanent rear facing auxiliary seating structure such that the vehicle is primarily used for transporting people.

Such rear facing seating structures result in the awkward, uncomfortable, and inconvenient situation where people sitting in the rear facing auxiliary seat are facing away from and generally in the opposite direction than their companion(s) sitting in the front seating structure. For example, such rear facing auxiliary seating structures make it difficult for the passenger(s) in the rear facing auxiliary seating structure to converse with the passenger(s) in the front seating structure (and vice-versa), which often results in the passenger(s) in the rear facing auxiliary seating structure attempting to uncomfortably turn around in their seat to talk with the passenger(s) in the front seating structure.

SUMMARY

In various embodiments, the present disclosure provides an auxiliary seating system for a light weight utility vehicle. In various implementations, the auxiliary seating system generally comprises a seat support cage that is attachable to a rear portion of the vehicle, and a pair of seat assemblies mounted to the cage structure. The seat assemblies are attached to the cage such that each seat assembly is oriented to be facing at least partially inward toward a longitudinal center line of the vehicle. In various embodiments, each seat assembly comprises a seat back and a seat bottom that is pivotal between a down position suitable for supporting a vehicle passenger sitting on the seat bottom, and an up position suitable for retaining a golf bag within the rear portion of the vehicle. In various instances each seat assembly additionally includes a golf bag yoke disposed on an underside of the respective seat bottom, and a seat belt structured and operable to retain a passenger in the respective seat assembly when the seat bottom is in the down position, and to retain a golf bag within the respective golf bag yoke when the seat bottom is in the up position.

While the present disclosure is primarily directed to light weight utility vehicles, it should be understood that the features disclosed herein can have application to other types of vehicles such as most lightweight vehicles that are not designated for use on roadways, e.g., maintenance vehicles, cargo vehicles, shuttle vehicles, golf carts, other all-terrain vehicles (ATVs), utility task vehicles (UTVs), recreational off-highway vehicles (ROVs), side-by-side vehicles (SSV), worksite vehicles, buggies, etc.

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

DRAWINGS

The drawings described herein are for illustration purposes only and are not intended to limit the scope of the present teachings in any way.

Corresponding reference numerals indicate corresponding parts throughout the several views of drawings.

DETAILED DESCRIPTION

Figure 1:
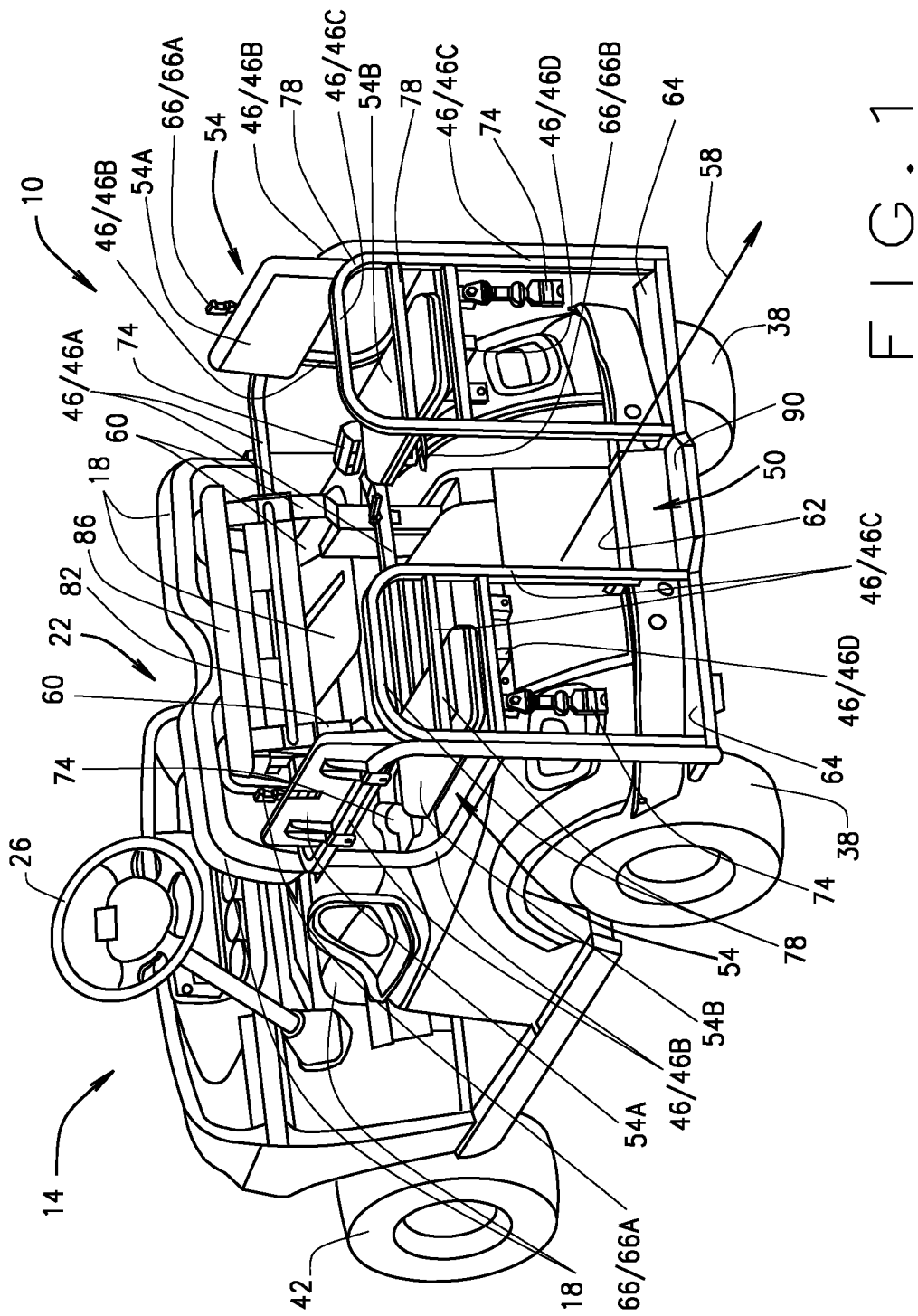
FIG. 1 is an isometric view of a light weight vehicle having an auxiliary seating structure mounted to a rear portion thereof, in accordance with various embodiments of the present disclosure.

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on," "engaged to or with," "connected to or with," or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on," "directly engaged to," "directly connected to," or "directly coupled to" another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between," "adjacent" versus "directly adjacent," etc.).

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and non-limiting.

Figure 2:
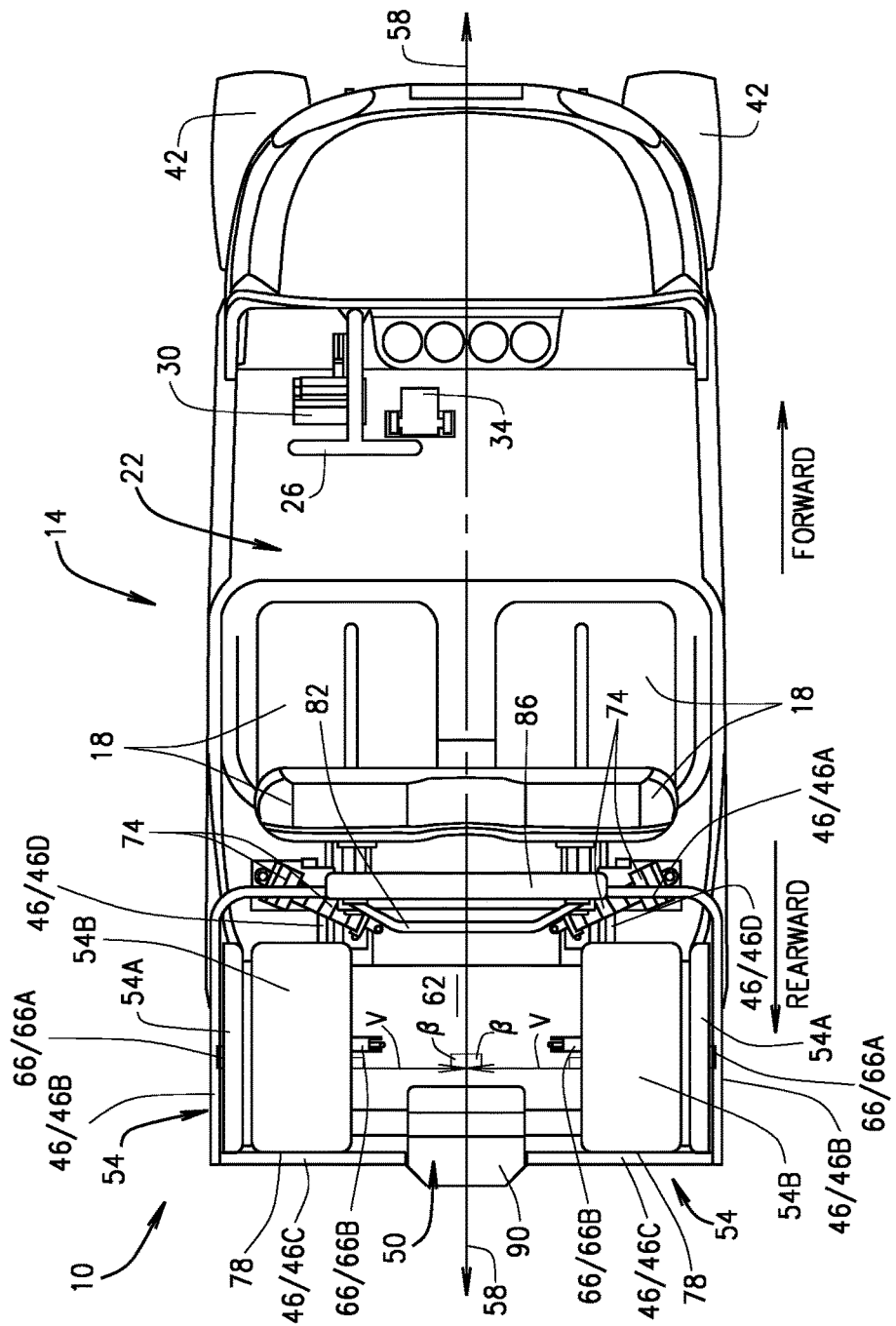
FIG. 2 is a top view of the vehicle with the auxiliary seating structure shown in FIG. 1, in accordance with various embodiments of the present disclosure.

Referring now to FIGS. 1 and 2, the present disclosure provides an auxiliary seating system 10 that can be attached to the rear portion of a vehicle 14 (e.g., a golf cart, or other light weight vehicle) to provide auxiliary, or additional, seating capacity for the vehicle 14. More particularly, the auxiliary seating system 10 provides seating capacity in addition to that provided by a primary seating structure 18 of the vehicle 14 that is structured and operable to seat at least a vehicle operator (e.g., a driver) of the vehicle 14 in a forward facing position (e.g., positioned or oriented to face toward the front of the vehicle 14). In various instances, the primary seating structure 18 can be suitable for seating an operator and one or more passenger in a forward facing position. Hence, the auxiliary seating structure 10 is structured and operable for seating one or more vehicle passenger in addition to the operator and any forward facing passengers seated in the primary seating structure 18. The primary seating structure 18 can comprise a single bench style seat or one or more forward facing side-by-side seats, or in alternative embodiments, multiple rows of bench style seats and/or one or more forward facing side-by-side seats.

Generally, the vehicle 14 additionally includes a passenger compartment 22 in which the primary seating structure 18 is located, a steering wheel 26 for use by the vehicle operator to control the directional movement of the vehicle 14, a brake pedal 30 for use by the vehicle operator to control slowing and stopping of the vehicle 14, and an accelerator pedal 34 for use by the vehicle operator to control the torque delivered by one or more vehicle prime mover(s) (not shown) to one or more rear wheel 38 and/or one or more front wheels 42. It will be understood that, as used herein, the rear portion of the vehicle 14 is portion of vehicle behind, or rearward, of the primary seating structure 18. Furthermore, as used herein, the word "forward" and the phrase "forward of" are used to describe the direction from a named component or structure toward the front of the vehicle 14 along a longitudinal axis 58 of the vehicle 14. Similarly, as used herein, the word "rearward" and the phrase "rearward of" are used to describe the direction from a named component or structure toward the rear of the vehicle 14 along the longitudinal axis 58 of the vehicle 14.

Referring now to FIGS. 1, 2, 4, and 5, in various embodiments, the auxiliary seating structure 10 includes a seat support cage 46 that is attachable, or mountable, to a rear portion of the vehicle 14. For example, the seat support cage 46 can be attachable, or mountable, to multiple places of a rear portion of a chassis and/or frame structure (not shown) of the vehicle 14. For example, in various embodiments the auxiliary seating structure 10 can additionally include one or more front stanchion structure 60 (best shown in FIG. 1) that is/are mountable to a portion of the chassis, frame structure, and/or body of the vehicle 14 such that a front portion of the seat support cage 46 (e.g., a front wall or front structural member(s) of the cage 46) can be mounted to the front stanchion structure(s) 60. In various instances, the front stanchion structure(s) 60 can be structured to also have a seat back of primary seating structure 18 mounted thereto. Additionally, in various implementations the auxiliary seating structure 10 can further comprise a rear mounting plate or beam 64 (best shown in FIG. 1) that can be mounted to a portion of the chassis, frame structure, and/or body of the vehicle 14 at or below a rear bumper of the vehicle 14 such that a rear portion of the seat support cage 46 (e.g., a rear wall or rear structural member(s) of the cage 46) can be mounted to the rear mounting plate/beam 64.

In various embodiments, wherein the vehicle 14 can be a golf cart having a golf bag bay 62, the seat support cage 46 is attachable, or mountable, to the rear portion of the vehicle 14 such that the seat support cage 46 is disposed around the golf bag bay 62 such that the golf bag bay 62 is disposed within an interior space defined by the seat support cage 46. Although, the vehicle 10 can be any light weight utility vehicle, such as a maintenance vehicle, cargo vehicle, shuttle vehicle, all-terrain vehicle (ATV), utility task vehicle (UTV), recreational off-highway vehicle (ROV), side-by-side vehicle (SSV), worksite vehicle, buggy, etc. the vehicle 10 will be illustrated and described herein by way of example as a golf cart.

In various instances, the seat support cage 46 comprises a plurality of various shaped and sized structural members, such as various shaped and sized tubing, rods, beams, braces, and/or bars (e.g., hollow aluminum tubing) that are interconnected to form a structurally rigid, sound and load bearing cage, skeleton, chassis, or framework that is referred to herein as the seat support cage 46. The seat support cage 46 includes a front wall 46A, opposing sidewalls 46B, and a back wall 46C. In various embodiments, the back wall 46C includes a passenger ingress/egress opening 50 that is sized and shaped to allow passengers to enter and exit the seat support cage 46. In various instances, the seat support cage 46 additionally includes at least a pair of cross members 46D connected between the front wall 46A and the rear wall 46C.

The auxiliary seating system 10 additionally includes one or more seat assembly 54 (e.g., a pair of opposing seat assemblies 54) that are mounted to the seat support cage 46. In the illustrated embodiments, each seat assembly 54 comprises a seat back 54A and a seat bottom 54B. However, it will be appreciated that in some alternative embodiments, the seat back 54A of one or more seat assemblies 54 may be omitted such that a seat assembly 54 of some alternative embodiments can have a seat bottom 54B, but not a seat back 54A. In various instances, the seat back 54A and seat bottom 54B of any given seat assembly 54 can be operatively connected to each other (e.g., directly connected to each other or connected to each other via intervening structure of the respective seat assembly 54) and mounted to the seat support cage 46 as a single unit. Or, in various other instances, the seat back 54A and seat bottom 54B of any given seat assembly 54 can be separate and independent from each other and independently mounted to the seat support cage 46.

Figure 4:
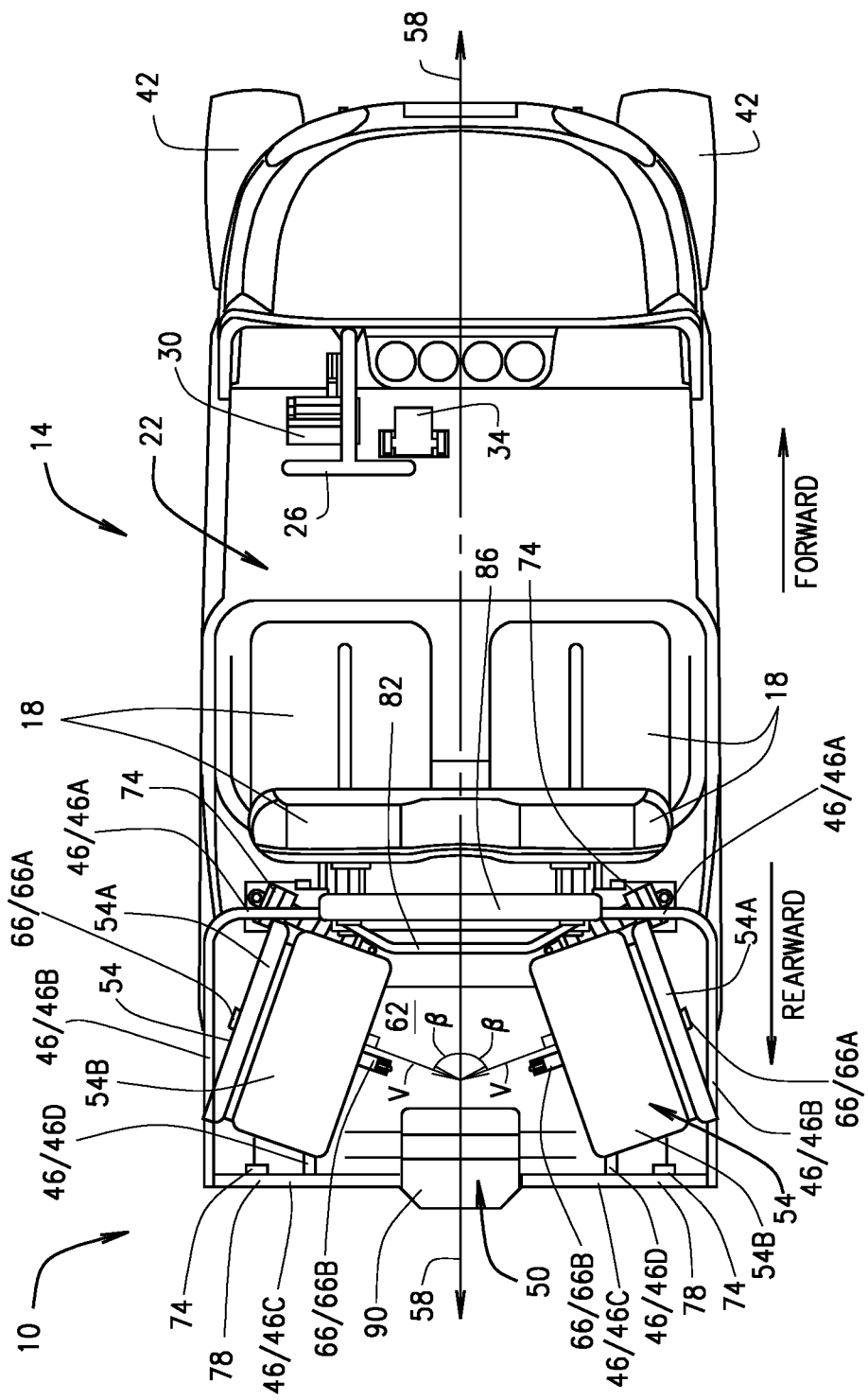
FIG. 4 is a top view of the vehicle with the auxiliary seating structure shown in FIG. 1 having a pair of seat assemblies oriented diagonally within a seat support cage of the auxiliary seating structure, and at an inward angle at least partially facing a longitudinal center line of the vehicle, in accordance with various embodiments of the present disclosure.
Figure 5:
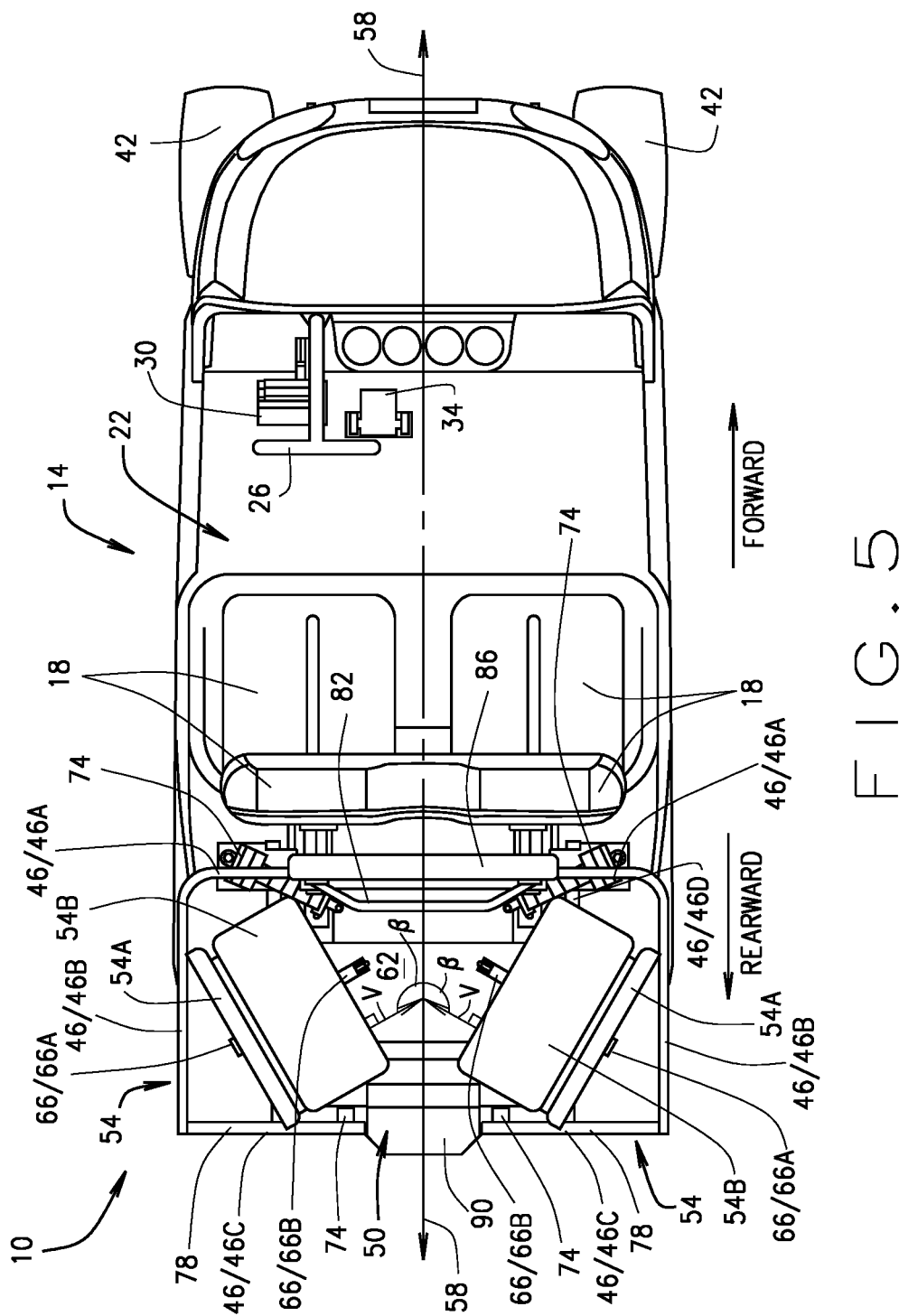
FIG. 5 is a top view of the vehicle with the auxiliary seating structure shown in FIG. 1 having a pair of seat assemblies oriented diagonally within a seat support cage of the auxiliary seating structure, and at an inward angle at least partially facing a longitudinal center line of the vehicle, in accordance with various other embodiments of the present disclosure.

Each seat assembly 54 is mounted to the seat support cage 46 such that each seat assembly 54 is oriented to be facing at least partially inward toward a longitudinal center line, or axis, 58 of the vehicle 14. More specifically, each seat assembly 54 is oriented such that a vector V extending substantially orthogonally (e.g., substantially at a 90° angle) from a front edge of each seat bottom 54B will intersect the longitudinal center line 58 of the vehicle 14 at an angle β that is between approximately 10° and approximately 170°. For example, as shown in FIG. 2, in various implementations the seat assembly(ies) 54 can be mounted to the seat support cage 46 such that the vector V extending orthogonally from the seat bottom(s) 54B intersect(s) the longitudinal center line 58 at the angle β of approximately 90°. In such instances, a pair of opposing seat assemblies 54 will be substantially directly facing each other. Or, for example, as shown in FIG. 4, in various implementations the seat assembly(ies) 54 can be mounted to the seat support cage 46 at a diagonal orientation within the seat support cage 46 such that the vector V extending orthogonally from the seat bottom(s) 54B intersect(s) the longitudinal center line 58 at the angle β of between approximately 10° and 90° (e.g., approximately 60°). In such instances, a pair of opposing seat assemblies 54 will be facing away from the primary seating structure 18 and indirectly toward each other. Or, for example, as shown in FIG. 5, the seat assembly(ies) 54 can be mounted to the seat support cage 46 such that the vector V extending orthogonally from the seat bottom(s) 54B intersect(s) the longitudinal center line 58 at the angle β of between approximately 90° and 170° (e.g., approximately 120°). In such instances, a pair of opposing seat assemblies 54 would be facing indirectly toward the primary seating structure 18 and indirectly toward each other.

Figure 3:
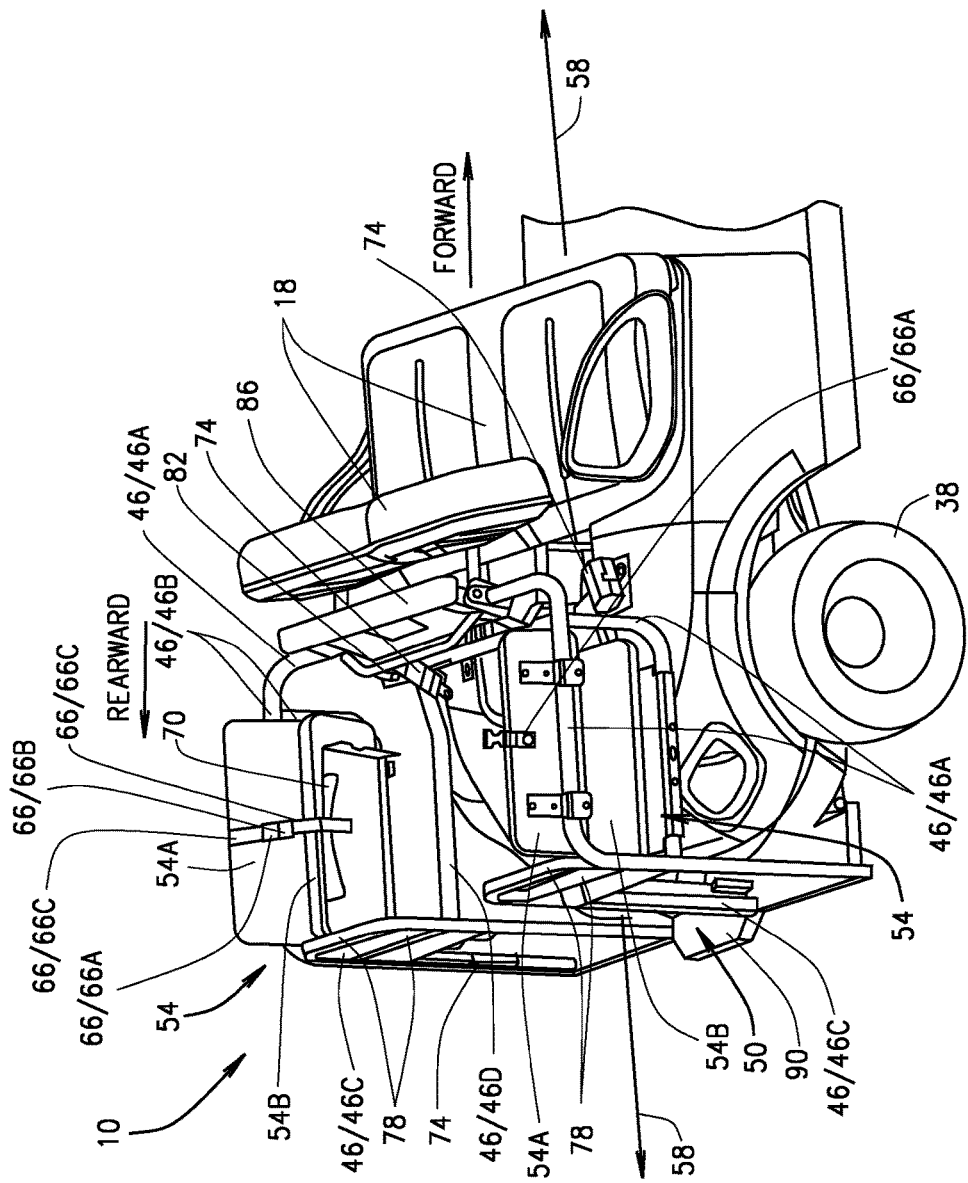
FIG. 3 is an isometric view of a portion of the vehicle with the auxiliary seating structure shown in FIG. 1, in accordance with various embodiments of the present disclosure.

Referring now to FIGS. 1, 2, 3, 4, and 5, in various embodiments, the seat bottom 54B of each seat assembly 54 is movable (e.g., pivotal) between a passenger seating position (e.g., a down position), shown by way of example in FIG. 3, and a stowed position (e.g., an up position), shown by way of example in FIGS. 1, 2, 4 and 5. When the seat bottom 54B is deployed in the passenger seating position the seat bottom 54B is moved (e.g., pivoted down) to provide a seat suitable for supporting a vehicle passenger sitting on the seat bottom 54B. When the seat bottom 54B is placed in the stowed position the seat bottom is moved, (e.g., pivoted up, down and/or to the side) such that greater access and less obstructed space is provided within the seat support cage 46 (e.g., greater and less obstructed access to the rear portion of the vehicle 14 within the seat support cage 46 is provided). For example, in the various instances wherein the vehicle 14 is a golf cart, the seat bottom(s) 54B can be moved to the stowed position to provide greater access to the golf bag bay 62 for placement and storage of one or more golf bag. In such instances, when the seat bottom(s) is/are deployed in the passenger seating position, the golf bag bay 62 can provide room for placement of the legs and feet of the passenger(s) sitting on the seat bottom(s) 54B.

In various embodiments, each seat assembly 54 can additionally include a seat bottom position retention device 66 that is structured and operable to retain the respective seat bottom 54B in the stowed position (e.g., an up position), as shown by way of example in FIG. 3. The seat bottom position retention device 66 can be any retention device suitable for selectably retaining the seat bottom 54B in the stowed position, e.g., a strap(s) and D-ring assembly, a strap(s) and hook-and-loop (e.g., Velcro®) assembly, a strap(s) and interlocking connectors assembly. For example, in various instances, the seat bottom position retention device 66 can comprise a first connector 66A that is removably interlockingly connectable to a second connector 66B, and one or more strap(s) 66C that connect the first connector 66A to the seat back 54A and/or the second connector 66B to the seat bottom 54B. Alternatively, one or both of the first and second connector(s) 66A and/or 66B can be directly connected to the respective seat back 54A and/or seat bottom 54B. In operation, once the seat bottom is moved to the stowed position (e.g., an up position), the first and second connectors 66A and 66B are removably interlockingly connected to retain the seat bottom 54B in the stowed position. Subsequently, to move the seat bottom from the stowed position to the passenger seating position, the first and second connectors 66A and 66B are disconnected, whereafter the seat bottom 54B can be moved to the passenger seating position.

Referring now to FIG. 3, in various embodiments, one or more of the seat assemblies can further include a golf bag yoke 70 formed or disposed on an underside of the respective seat bottom 54B. Each golf bag yoke 70 is structured and operable to cradle, steady and/or retain a golf bag within the golf bag bay 62 when the respective seat bottom is placed in the stowed position. Each golf bag yoke 70 can be any device or structure that is structured and operable to cradle, steady and/or retain a golf bag that has been placed in the golf bag bay 62 and retained against or in the yoke 70 within the respective within golf bag bay 62 (and the yoke 70) such that the respective golf bag will be stabilized and not be jostled or fall out of the golf bag bay 62. In various instances, to retain a golf bag within a respective golf bag yoke 70 the respective seat assembly can further include a bag retention strap that can be wrapped around the respective golf bag to retain the golf bag within the respective yoke 70. For example, in various embodiments, one or more seat assembly 54 can comprise a seat belt 74 that that is structured and operable to retain a passenger in the respective seat assembly 54 when the seat bottom 54B is in the passenger seating position, and to retain a golf bag against and/or within the respective golf bag yoke 70 when the seat bottom 54B is in the stowed position.

Referring now to FIGS. 1 through 5, in various embodiments, on opposing sides of the passenger ingress/egress opening 50 the seat support cage rear wall 46C comprises a pair of passenger retention structures, panels, or barriers 78 that extend above the level of the seat assembly seat bottom (s) 54B. Each passenger retention structure 78 is structured and operable to provide a barrier and/or rear passenger grab bar to which a passenger sitting in the seat assembly(ies) 54 can hold on to for aiding and assisting a passenger to remain seated in the corresponding seating assembly 54 and within the interior space of the seat support cage 46. Additionally, in various embodiments, the auxiliary seating structure 10 can further include a front passenger grab bar 82 connected to the front wall 46A. The front grab bar 82 is structured and operable to provide a grab bar for a passenger sitting the seat assembly(ies) 54 to hold in order to aid and assist the passenger in remaining seated in the corresponding seating assembly 54 and within the interior space of the seat support cage 46. Furthermore, in various embodiments, the auxiliary seating structure 10 can still further include one or more arm rest 86 connected to the front wall 46A and/or the rear wall 46C. The arm rest(s) 86 is/are structured and operable to provide a support on which one or more passenger seated in the seat assembly(ies) 54 can comfortably set and rest their arm(s). Still yet further, in various embodiments, the auxiliary seating structure 10 can include a step plate 90 disposed within the ingress/egress opening 50 and connected to at least one of the rear bumper of the vehicle 14 and the rear mounting plate 64 of the auxiliary seating structure 10. The step plate 90 is structured and operable to provide one or more step on which a passenger can step and/or stand when entering the interior space of auxiliary seating structure 10. In various instances, the step plate 90 is not intended to be stood on during operation of the vehicle 14.

Figure 6:
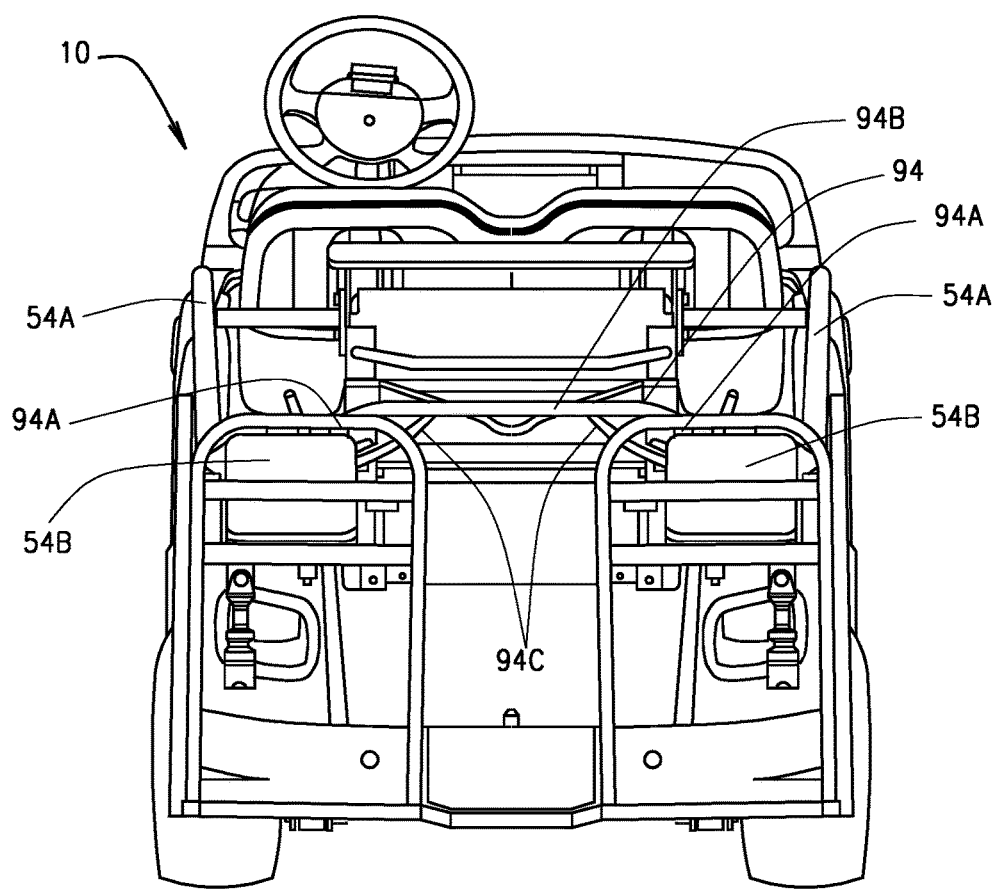
FIG. 6 is a rear view of an embodiment of the auxiliary seating structure shown in FIG. 1 having a flip-up golf bag rack, in accordance with various embodiments of the present disclosure.

Referring now to FIG. 6, in various embodiments wherein the vehicle 14 is a golf cart, the auxiliary seating structure 10 can include a flip-up bag rack 94 pivotally mounted to the front wall 46A of the seat support cage 46, (or alternatively pivotally mounted to other structure mounted to the front wall 46A). The flip-up bag rack 94 is structured and operable to be selectively pivotal between a deployed position and a stowed position (as shown in FIG. 6). When in the stowed position, the flip-up bag rack 94 is pivoted downward such that arms 94A of the flip-up rack 94 are disposed between the front wall 46A and the end of the seat bottom(s) 54B such that seat bottom(s) 54B prevent the flip-up bag rack 94 from being pivoted to the deployed position. To pivot the flip-up bag rack 94 to the deployed position, the seat bottom(s) 54B can be moved to the stowed position, whereafter the arms 94A are not impeded by the seat bottom(s) 54B, and the flip-up bag rack 94 can be pivoted upward to the deployed position. In the deployed position, the arms 94 extend outward away from the front wall 46A such that one or more golf bag can be disposed between the arms 94A and rest against a back bar 94B of the flip-up bag rack 94 that joins the arms 94A (e.g., is connected to or integrally formed with the arms 94A). In various instances the back bar 94B is pivotally or hingedly connected (directly or indirectly) to the front wall 46A. The flip-up bag rack 94 can be retained in the deployed position using any suitable retention device, such as one or more thumb screws, one or more spring actuated latching device, one or more slide bolt, etc. In various embodiments, the flip-up bag rack 94 includes one or more bag strap 94C that is/are structured and operable to retain one or more golf bag to, or within, the flip-up bag rack 94. For example, in various instances, once a golf bag has been placed against the back bar 94B and adjacent an arm 94A, a corresponding strap 94C can be wrapped across the golf bag and inserted through a compression latch or buckle (or other suitable strap retention device) (not shown), then pulled tight across the golf bag and held in place by the compression latch or buckle to retain the golf bag within the flip-up bag rack 94.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:

1. An auxiliary seating system for a vehicle, said system comprising:
    a seat support cage attachable to a rear portion of a vehicle; and
    at least one seat assembly mounted to the seat support cage such that each of the at least one seat assembly is oriented to be facing at least partially inward toward a longitudinal center line of the vehicle.

2. The system of claim 1, wherein each seat assembly comprises a seat bottom, wherein the seat bottom is movable between a passenger seating position and a stowed position.

3. The system of claim 2, wherein each seat assembly further comprises a seat position retention device structured and operable to retain the seat bottom in the stowed position.

4. The system of claim 2, wherein at least one seat bottom comprises a golf bag yoke disposed on an underside of the respective seat bottom.

5. The system of claim 4, wherein at least one seat assembly further comprises a seat belt that is structured and operable to retain a passenger in the respective seat assembly when the seat bottom is in the passenger seating position, and to retain a golf bag within the respective golf bag yoke when the seat bottom is in the stowed position.

6. The system of claim 1, wherein the seat support cage comprises a front wall, opposing sidewalls and a rear wall, wherein the rear wall includes a passenger ingress/egress opening.

7. The system of claim 6, wherein on opposing sides of the passenger ingress/egress opening the rear wall comprises a passenger retention structure.

8. The system of claim 6 further comprising a passenger grab bar connected to the front wall.

9. The system of claim 6 further comprising an arm rest connected to the front wall.

10. A vehicle, said vehicle comprising:
at least one primary seating structure that is structured and operable to provide a seat for at least a driver of the vehicle; and
an auxiliary seating system disposed on a rear portion of the vehicle behind the at least one primary seating structure, wherein the auxiliary seating system comprises:
a seat support cage attached to the rear portion of a vehicle behind the at least one primary seating structure; and
at least one seat assembly mounted to the seat support cage such that each of the at least one seat assembly is oriented to be facing at least partially inward toward a longitudinal center line of the vehicle.

11. The vehicle of claim 10, wherein each seat assembly comprises a seat bottom, wherein the seat bottom is movable between a passenger seating position and a stowed position.

12. The vehicle of claim 11, wherein each seat assembly further comprises a seat position retention device structured and operable to retain the seat bottom in the stowed position.

13. The vehicle of claim 11, wherein at least one seat bottom comprises a golf bag yoke disposed on an underside of the respective seat bottom.

14. The vehicle of claim 13, wherein at least one seat assembly further comprises a seat belt that is structured and operable to retain a passenger in the respective seat assembly when the seat bottom is in the passenger seating position, and to retain a golf bag within the respective golf bag yoke when the seat bottom is in the stowed position.

15. The vehicle of claim 10, wherein the seat support cage comprises a front wall, opposing sidewalls and a rear wall, wherein the rear wall includes a passenger ingress/egress opening.

16. The vehicle of claim 15, wherein on opposing sides of the passenger ingress/egress opening the rear wall comprises a passenger retention structure.

17. The vehicle of claim 15 further comprising a passenger grab bar connected to the front wall.

18. The system of claim 15 further comprising an arm rest connected to the front wall.

19. An auxiliary seating system for a golf cart, said system comprising:
a seat support cage attachable to a rear portion of a golf cart encompassing a golf bag bay of the golf cart; and
at least one seat assembly mounted to the seat support cage such that each of the at least one seat assembly is oriented to be facing at least partially inward toward a longitudinal center line of the golf cart, each seat assembly comprising:
a seat bottom that is movable between a passenger seating position suitable for supporting a vehicle passenger sitting on the seat bottom, and a stowed position suitable for retaining a golf bag within the golf bag bay;
a golf bag yoke disposed on an underside of the respective seat bottom; and
a seat belt structured and operable to retain a passenger in the respective seat assembly when the seat bottom is in the passenger seating position, and to retain a golf bag disposed within the golf bag bay within the respective golf bag yoke when the seat bottom is in the stowed position.

20. The system of claim 19 further comprising at least one of a passenger grab bar and an arm rest connected to a front wall of the seat support cage.

* * * * *